Nov. 24, 1959 C. T. SCHNELL 2,914,329

PHONOGRAPHS FOR PLACING THE PICK-UP ARM NEEDLE IN THE CORRECT INITIAL PLAYING POSITION ON A SOUND DISC RECORD TO BE PLAYED

Filed Dec. 19, 1956

INVENTOR

CHARLES TORBJORN SCHNELL

BY Irwin S. Thompson

ATTY.

United States Patent Office 2,914,329

Patented Nov. 24, 1959

2,914,329

PHONOGRAPHS FOR PLACING THE PICK-UP ARM NEEDLE IN THE CORRECT INITIAL PLAYING POSITION ON A SOUND DISC RECORD TO BE PLAYED

Charles Torbjörn Schnell, Motala, Sweden, assignor to Industriaktiebolaget Luxor, Motala, Sweden, a corporation of Sweden Application December 19, 1956, Serial No. 629,394

Claims priority, application Sweden December 22, 1955

3 Claims. (Cl. 274—15)

The present invention relates to a device for placing the pick-up arm needle in the correct initial playing position on a sound disc record to be played, irrespective of the diameter thereof, in that kind of phonographs, in which a support member and a releasing member co-operate with the pick-up arm, the former one being arranged to be in a position below the horizontal plane through the needle point when the pick-up arm is set down on the record inside its outer edge and to carry the pick-up arm, while it by a special drive mechanism is moved outwards to the outer edge of the record, upon arrival of which the releasing member effects a disconnection of the pick-up arm from the drive mechanism and a displacement of the support member to a position above the horizontal plane through the needle point for bringing the needle into engagement with the initial sound groove of the record.

Such devices are known before. These devices have a great disadvantage this being the difficulty to get the needle safely in engagement with the initial sound groove of the record irrespective of its different kinds, thus irrespective of different record diameters, different record rotational speeds, different distances from the edge of the record to the beginning of the initial sound groove and different shapes of the outer edge of the record. When the pick-up arm has been driven outwards to the outer edge of the record and by means of the releasing member has been disconnected from the drive mechanism it tends by the inertia to move an indefinite distance further outwards, which makes it difficult to control the set down position of the needle. The different record character mentioned contributes to make this position still more indefinite.

The present invention has for its object to eliminate this disadvantage.

Figure 1:
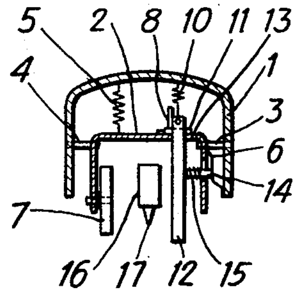
Figure 2:
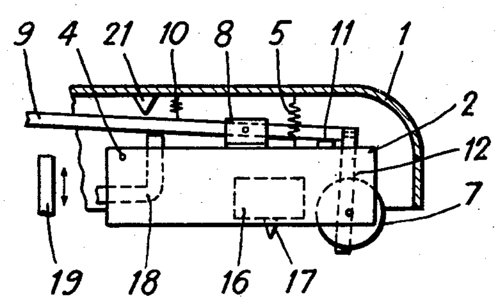
Figure 3:
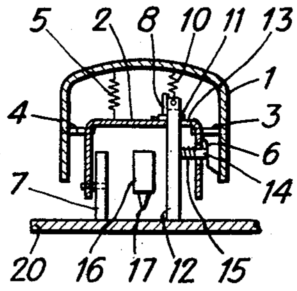
Figure 4:
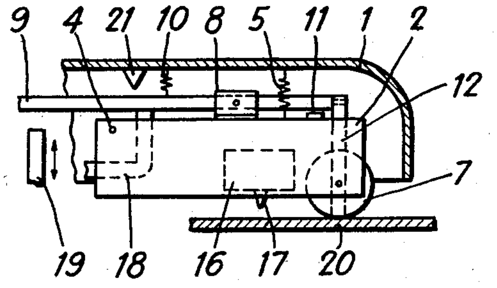
Figure 5:
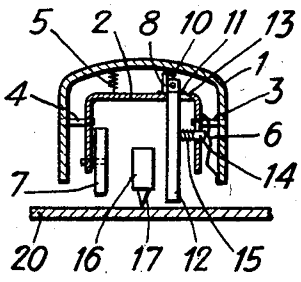
Figure 6:
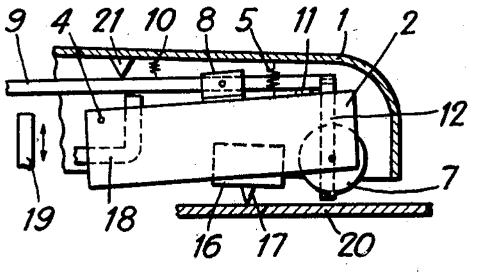

The invention will be described in the following with reference to the accompanying drawing, in which Figs. 1 and 2 show the device according to the invention in a first working positon, Figs. 3 and 4 in a second working position and Figs. 5 and 6 in a third working position. Figs. 1, 3 and 5 are front views of the device and Figs. 2, 4 and 6 are side views of the device.

In the drawing 1 designates the pick-up arm of a phonograph and 2 a U-shaped stirrup rotatably disposed about two pins 3 and 4 arranged in this pick-up arm, which stirrup through the actuation of a spring 5 tends to rotate in counter clock-wise direction about these pins (Figs. 2, 4 and 6) to a position inside the pick-up arm, but in the first and second working positions is prevented from this by a lock spring 6, which catches the top of the stirrup. In this is further rotatably arranged a roller 7, the shaft of which roller is disposed at such an angle with the radius of the record drawn through the point of engagement with the record that, when the record rotates, the roller moves inwards on the record thereby swinging the pick-up am towards the centre of the record. On the stirrup there is further fixed a bracket 8 in which a rod 9 is pivoted. This rod through actuation from the spring 10 tends to turn in clock-wise direction (Figs. 2, 4 and 6) towards a stop 11 fixed on the stirrup 2. The spring 10 is weaker than the spring 5. In the right end of the rod 9 there is rotatably disposed in a direction perpendicular to the length direction of the rod an arm 12, which passes the top of the stirrup 2 in a slot 13 made therein and protrudes below the roller 7 a distance, which corresponds to or is somewhat less than the thickness of a sound disc record.

A transverse pin 14 which passes the wall of the stirrup 2 and on its other side co-operates with the lock spring 6 mentioned before is fixed to the arm 12. Placed between this arm and the wall of the stirrup and arranged around the transverse pin 14 there is a spring 15, which presses the arm 12 against the left edge of the slot 13, so that the arm is held in the position shown in Figs. 1, 3 and 5 in relation to a needle 17 in a pick-up cartridge 16 disposed in the pick-up arm in normal manner. The slot 13 is shaped in such a manner that it allows the arm 12 against action of the spring 15 to turn in counter clockwise direction somewhat from the position shown in the lastmentioned figures.

With the rod 9 firstly a coupling lever 18 and secondly a lifting bar 19 cooperate. The coupling lever 18 is arranged in such a manner that when it is actuated by the rod 9 and is pressed downwards, it connects in a manner not shown the pick-up arm to a special drive mechanism. Such a mechanism is shown, for instance, in the co-pending patent application Serial No. 508,758 to Wennerbo, now Patent No. 2,886,329, issued May 12, 1959, and is there indicated by the wheel 3. The lever 18 in the present device can be coupled to the lever 20 in the above-mentioned application in such a way that when depressing the lever 18, this turns the lever 20 in clockwise direction and rocks the coupling rod 22 into engagement with the teeth of the wheel 3, thereby driving the pick-up arm from a central part of the record outwards to its outer edge. When, however, the coupling lever 18 is not actuated by the rod 9 (in the present application), it is by the spring 24 (in the application No. 508,758) moved to a higher position, this spring turning the lever 20 in an anti-clockwise direction and rocking the coupling rod 22 out of engagement with the teeth of the wheel 3, thus disconnecting the pick-up arm from the drive mechanism.

Once between each playing of the records, the lifting bar 19 is by the normal record-changing mechanism (not shown) of the phonograph given a motion upwards and downwards thereby engaging the rod 9 for an object, which will be further described herebelow. The movement of the lifting bar 19 can be effected, for instance, in the folowing manner: In the record-changing mechanism there is normally a control disc (cam disc) which is rotated one revolution between every playing of a record. The bar can rest upon the upper flat side of this disc, which on one place along its circumference is provided with a cam. During the revolution of the disc this cam will momentarily lift the bar 19 into engagement with the rod 9.

The described device functions in the following manner. Before the playing of a record the pick-up arm by the normal record changing mechanism is in a known manner brought from a position outside the record to a position where the roller 7 is above a point, which lies inside the outer edge of the record. From this position the pick-up arm by the same mechanism is set down on the record. The details now occupy the positions shown in Figs. 1 and 2 with the rod 9 brought into contact with the stop 11 and the arm 12 protruding below the roller 7. Thus the coupling lever 18 is not actuated and the special drive mechanism is disconnected from the pick-up arm. When the pick-up arm lowers to the record this is hit first by the arm 12, which thereby is brought somewhat upwards in the pick-up arm against action of the spring 10, until also the roller 7 contacts the records, which in the drawing is indicated with 20. At the upward movement of the arm 12, which means a turning of the rod 9 in counter clock-wise direction, this arm actuates the coupling lever 18 and presses it downwards, so that the special drive mechanism is connected to the pick-up arm. The latter is now driven outwards to the outer edge of the record with the roller 7 supporting the pick-up arm. The outwards directed force on the pick-up arm caused by the special drive mechanism is greater than the inwards directed force caused by the angularly disposed roller 7. The details now occupy the positions according to Figs. 3 and 4.

Thus both the roller 7 and the arm 12 are in contact with the record during the outward movement of the pick-up arm, while the needle 17 is somewhat above the record surface. The arm 12 is during this operation keeping the pick-up arm and the special drive mechanism in connection with each other. Seen in the present direction of movement of the pick-up arm the arm 12 is situated in front of the roler 7 and thus is the first one to leave the record surface at the arrival of the pick-up arm to the outer edge of the record. When leaving the record the arm 12 loses its support from below and is free to move to its lower positions according to Figs. 1 and 2 thereto forced by the spring 10.

This means that the actuation of the rod 9 on the coupling lever 18 ceases and the pick-up arm is therefore disconnected from its special drive mechanism. Thus the outwards directed force on the pick-up arm ceases.

It is now possible that due to the inertia the pick-up arm continues its movement somewhat further outwards, which, however, in this device according to the invention is without importance, as the pick-up arm is still supported by the roller 7. Only this roller is now in contact with the record and in co-operation with the rotating record moves the pick-up arm inwards, until the side of the arm 12 contacts the outer edge of the record. At a further inward movement of the pick-up arm caused by the roller 7 the arm 12 is turned in counter clock-wise direction (Fig. 1) against action of the spring 15. The transverse pin 14 fixed to the arm 12 thereby presses the lock spring 6 to the right so that it loses its catch about the top of the stirrup 2. The spring 5 thus being free for action, now draws the stirrup 2 together with the rod 9 and the roller 7 in counter clock-wise direction from the position according to Fig. 2 to the position according to Fig. 6. The roller 7 as well as the arm 12 are now in positions above the horizontal plane through the needle point and the needle 17 will thus enter the initial sound groove of the record and can thereafter play the record without hindrance. The horizontal distance between the needle 17 and the arm 12 in Fig. 1 is of course so chosen that when the release occurs the needle is in the wanted position inside the outer edge of the record.

When the playing of the record is ended the pick-up arm is in normal manner raised from the record. After that the lifting bar 19 is by the record changing mechanism brought upwards and pressed against the rod 9. About an edge 21 disposed in the pick-up arm this rod is now turned in clock-wise direction in Fig. 6, which movement through the stop 11 and the bracket 8 is transmitted to the stirrup 2, this also being turned in clock-wise direction about the pins 3 and 4. The turn movement of the rod 9 continues until the lock spring 6 can again catch the top of the stirrup 2. The lifting bar 19 is thereafter moved downwards and the details again occupy the positions according to Fig. 1, the device thus being ready for sensing and playing the next record.

As the needle pressure now used for playing records is very small it can be difficult to obtain during the outward movement of the pick-up arm a safe function of the coupling connection and disconnecting the pick-up arm and the drive mechanism and being controlled by the arm 12, the rod 9 and the lever 18. This problem can, however, be solved in such a manner that an additional pressure is applied to the pick-up arm during its outward movement, which pressure is automatically removed when after the sensing of the record edge by the arm 12 this arm effectuates the drawing back of the stirrup 2 to the position according to Fig. 6, so that during the playing of the record the normal needle pressure is existent.

What I claim is:

1. In combination with a pick-up arm of a phonograph, a drive mechanism for moving the pick-up arm laterally over a phonograph record, a disengaging coupling device inserted between said drive mechanism and said pick-up arm, said coupling device including a coupling member for engaging and disengaging the coupling, and a support on said pick-up arm for engaging the surface of a record to be played for holding the pick-up needle out of engagement with said record while the drive mechanism with engaged coupling moves the pick-up arm from an inner set down position on said record outwards to its outer edge, said support being disposed at such an angle with the radius of the record drawn through the point of engagement with the record that it tends to move the pick-up arm towards the centre of the record, said force being smaller than the outwards directed force on the pick-up arm caused by the drive mechanism as long as the latter is effective, a feeler on the pick-up arm for indicating the outer edge of the record, said feeler being placed before the support, seen in the direction of the outward movement of the pick-up arm, said feeler further being operatively connected to said coupling member for disengaging the coupling while indicating the outer edge of the record.

2. In combination with a pick-up arm of a phonograph, a drive mechanism for moving the pick-up arm laterally over a phonograph record, a disengaging coupling device inserted between said drive mechanism and said pick-up arm, said coupling device including a coupling member for engaging and disengaging the coupling, and a support on said pick-up arm for engaging the surface of a record to be played for holding the pick-up needle out of engagement with said record while the drive mechanism with engaged coupling moves the pick-up arm from an inner set down position on said record outwards to its outer edge, a feeler on the pick-up arm for indicating the outer edge of the record, said feeler being operatively connected to said coupling member; and further being movable between two different height positions, an upper one, when supported by the record for effectuating the coupling member in connecting purpose and a lower one when unsupported outside the outer edge of the record for effectuating the coupling member in disconnecting purpose.

3. In combination with a pick-up arm of a phonograph, a drive mechanism for moving the pick-up arm laterally over a phonograph record, a disengaging coupling device inserted between said drive mechanism and said pick-up arm, said coupling device including a coupling member for engaging and disengaging the coupling, and a support on said pick-up arm for engaging the surface of a record to be played for holding the pick-up needle out of engagement with said record while the drive mechanism with engaged coupling moves the pick-up arm from an inner set down position on said record outwards to its outer edge, said support being disposed at such an angle with the radius of the record drawn through the point of engagement with the record that it tends to move the pick-up arm towards the centre of the record, said force being smaller than the outwards directed force on the pick-up arm caused by the drive mechanism as long as the latter is effective, a feeler on the pick-up arm for indicating the outer edge of the record, said feeler being operatively connected to said coupling member, and further being movable between two different height positions, an upper one, when supported by the record for effectuating the coupling member in connecting purpose and a lower one when unsupported outside the outer edge of the record for effectuating the coupling member in disconnecting purpose, said feeler also being movable in a lateral direction to be moved in such a direction by the record edge when it is outside this edge and the pick-up arm is moved inwards by the support, this lateral movement being used for effectuating a mechanism for drawing back the support and the feeler.

References Cited in the file of this patent

UNITED STATES PATENTS

| | | |
|---|---|---|
| 1,629,986 | Battey | May 24, 1927 |
| 2,504,596 | Scriven | Apr. 18, 1950 |
| 2,586,422 | Fisher | Feb. 19, 1952 |